Patented Apr. 26, 1938

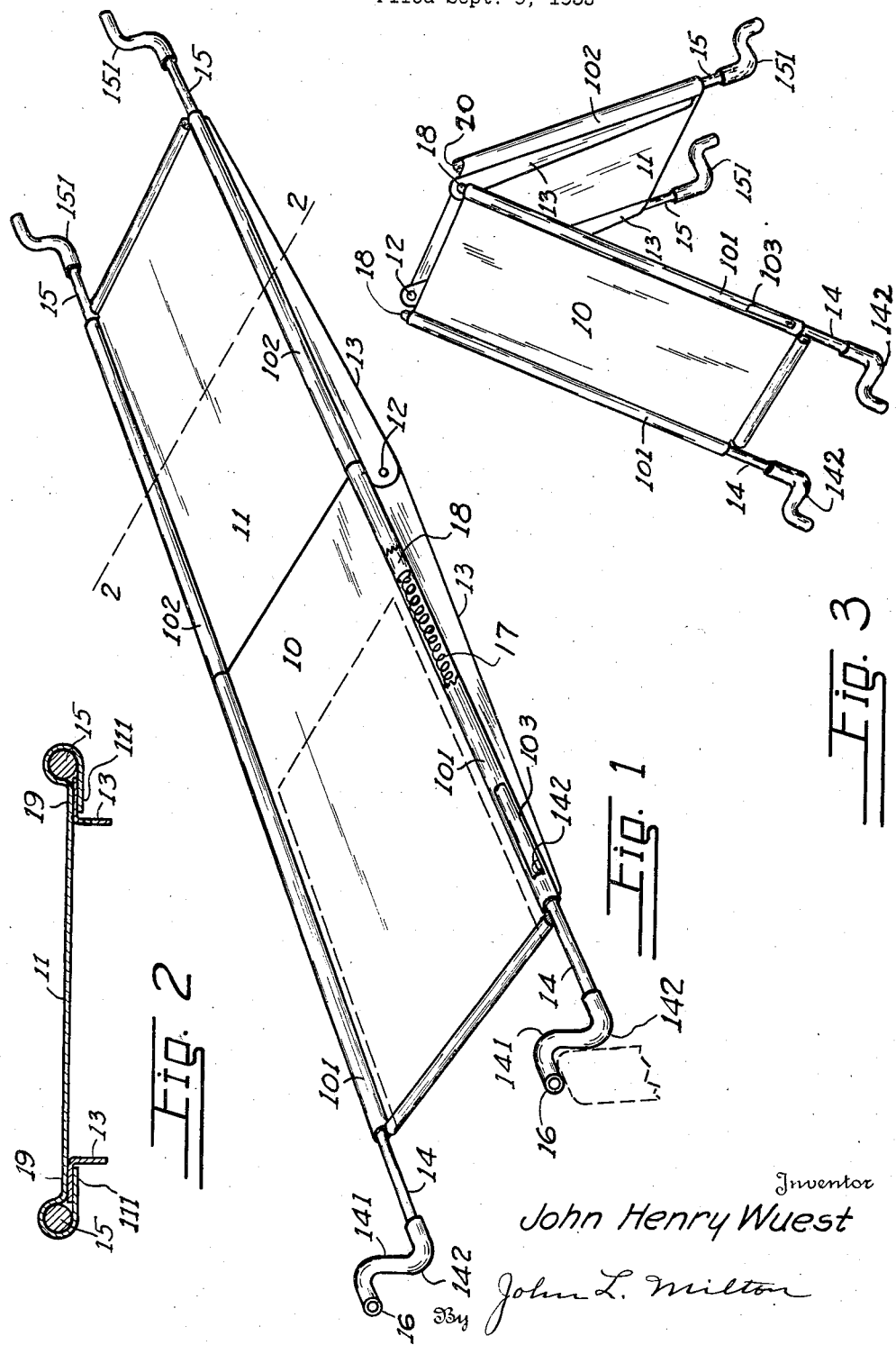

2,115,323

UNITED STATES PATENT OFFICE 2,115,323

AUTOMOBILE SERVING TRAY

John Henry Wuest, Louisville, Ky., assignor to National Incar Table Co., Incorporated, Louisville, Ky.

Application September 9, 1935, Serial No. 39,688

4 Claims. (Cl. 311—21)

The incident invention pertains to a serving tray organized for being instantly and securely lodged internally of an automobile.

The main object of this invention is to provide means for serving a meal (food) to the seated occupants of an automobile and to dispense with the accepted but objectionable current inconvenience, physical and mental discomfort.

Another object resides in constructing a serving tray to present ample usable surface for the lodgement of food serving and consuming equipment that can be instantly but securely attached to an automobile without encroaching upon the comfort of the dining occupants.

A further object of this invention is to incorporate principles and features into automobile serving trays wherein only two or three models are required to provide comfortable and attractive serving facilities in substantially all models, all makes and all ages of automobiles.

A still further object is to construct a thoroughly dependable, durable light weight automobile serving tray at a low cost of manufacture.

With the foregoing and other objects which will be revealed as a description of the details of construction proceeds and hereinafter claimed, it must be understood that departure from the selected embodiment of my invention can be indulged without departure from the spirit and scope of this invention.

Fig. 1 is a perspective view of my folding inner-car table in extended position, shown principally in full line projection with a small portion cut out to reveal a portion of an underlying member.

Fig. 2 is an enlarged cross sectional elevation of Fig. 1 at line 2—2.

Fig. 3 is a perspective view on a reduced scale of the table, shown in Fig. 1, in a partly folded position.

Numerals 10 and 11 indicate the two sections of the top of an automobile serving tray hinged together as a unit by pivots 12, which are lodged in leafs 13, 13, which also serve to form an integral part of and as ribs to reinforce the top sections 10, 11. The top sections are made from rectilinear pieces of sheet metal with each of the parallel edges rolled into rims 101, 102 extending above and below the parallel forces of said top for the purposes of giving strength and forming sockets for the reception of bolts 14, 14 and 15, 15. The latter are preferably fixed in the encompassing rims 102. Bolts 14 are slidably mounted in their corelated sockets and are provided with lugs 142 which project through apertures 103, which serve as stops for the bolts, each of which is urged outwardly by a spring 17, the inner end of which contacts fixed pin or bolt 18. These apertures have excessive width so as to allow the bolts a rotative movement, the purposes of which will be dealt with hereinafter.

The leaf-ribs 13 are of a right angle formation with one leg placed against the under or lower surface of the top member and under the extended edges 111 of the sheet that forms the top and roll rims which are assembled into a three ply integral structure at each of the parallel longitudinal sides by spot welding or an equivalent means, indicated by numeral 19.

To insure a rigid mounting for the table, the top when located for use, is dropped below the points of suspension, by means of the goose-neck formation of the ends of the bolts which are also shrouded in a sheath of rubber 16. These necks are fashioned with an abnormal bend 141, 151, to provide a clearance and two definite points of contact for a stabilizing mounting. It will be noted that the shanks 141 of the goose-necks are shaped so as to rest on the top of an automobile door sill, not shown but indicated by dotted lines adjacent one of the goose-necks, while the lower protuberance 142 engages the vertical wall of same. The rotative movements of bolts 14 referred to above, together with the outward pressure exerted on each bolt by a spring and the two definite points of contact result in an equalized firm mounting for each bolt, all of which cooperate for the accomplishment of the objectives adverted at the outset. Bolts 15 can be mounted similarly to 14, however the preferred arrangement is to have one pair rigid and the other adjustable and spring pressed.

The exposed ends of fixed pins 18 each have a rounded nose for entrance into the registering socket or recess 20 of the companion leaf to function as a key to add stability to the extended or open structure.

It will be noted that a non-folding or rigid serving tray can be produced embodying the same principles and features by forming sections 10 and 11 into an integral tray simply by using a sheet of metal for the top of the same width and of twice the length, same ribs of twice the length and eliminating the hinges.

At the left hand side of section 10 are dotted lines, which with the intersected rim form a rectangle. When the encompassed metal is removed a U shaped opening results. With this effected, a clearance for the steering wheel is made thus a serving table is produced for use of the occupants of the driver's seat.

Having thus described my invention, I wish to be limited only by the appended claims.

I claim:

1. An elongated automobile serving tray, comprising a top, formed with rolled rims along the two parallel sides, sockets, bolts in said sockets, springs in said sockets which urge said bolts into an extended position, right angle reinforcing ribs, one leg disposed perpendicular to said top and the other leg secured to said top under and with the edge of said rim.

2. An elongated automobile serving tray, comprising a top, formed with rolled edges along the two parallel sides constituting sockets, slidable and rotatable bolts in said sockets, springs in said sockets which urge said bolts into an extended position, right angle reinforcing ribs, one leg disposed perpendicular to said top and the other leg secured to said top under and with the edge of said rim.

3. An elongated automobile folding serving tray, comprising two sections each having a top, formed with rolled edges along the two parallel sides constituting sockets, bolts in said sockets, springs in said sockets which urge said bolts into an extended position, right angle reinforcing ribs, one leg disposed perpendicular to said top and the other leg secured to said top under and with the edge of said rim, hinge bearings disposed in said ribs adjacent the ends of same and pins in said bearings to constitute hinges for said sections.

4. An elongated folding automobile serving tray, comprising a top, formed with rolled reenforcing rims along the two longitudinal parallel sides extending above and below the parallel faces of said top also constituting sockets, bolts slidably mounted in said sockets, springs in said sockets which urge said bolts into an extended position, fixed bolts mounted inside the inner ends of the sockets of one leaf and projecting for extending into the sockets of the companion leaf, right angle longitudinal reenforcing ribs, one leg disposed perpendicular to said top and the other leg secured to said top under and with the edge of said rim.

JOHN HENRY WUEST.